Nov. 10, 1964   R. T. DOLLAR   3,156,113
DEVICE FOR TESTING ENGINE FUEL SYSTEMS
Filed Oct. 30, 1961   3 Sheets-Sheet 1
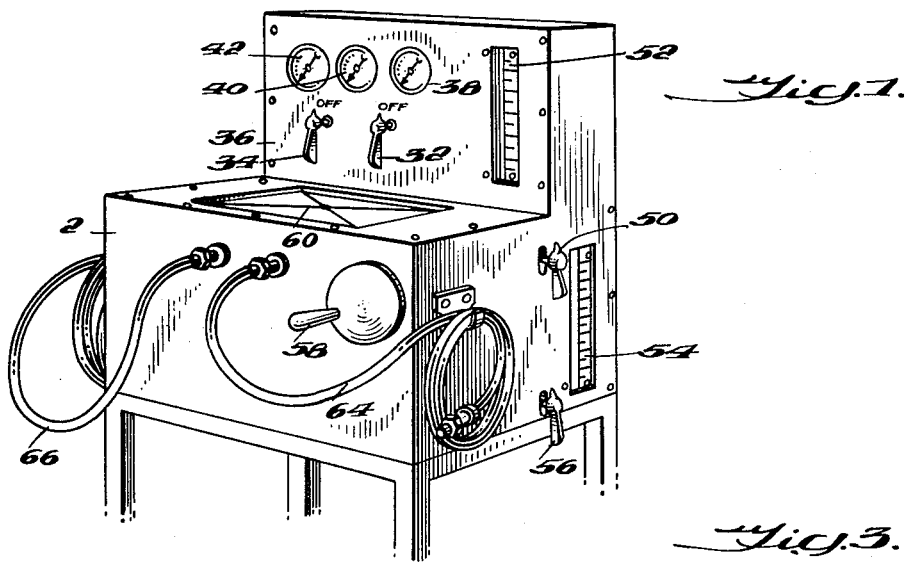
Fig. 1.
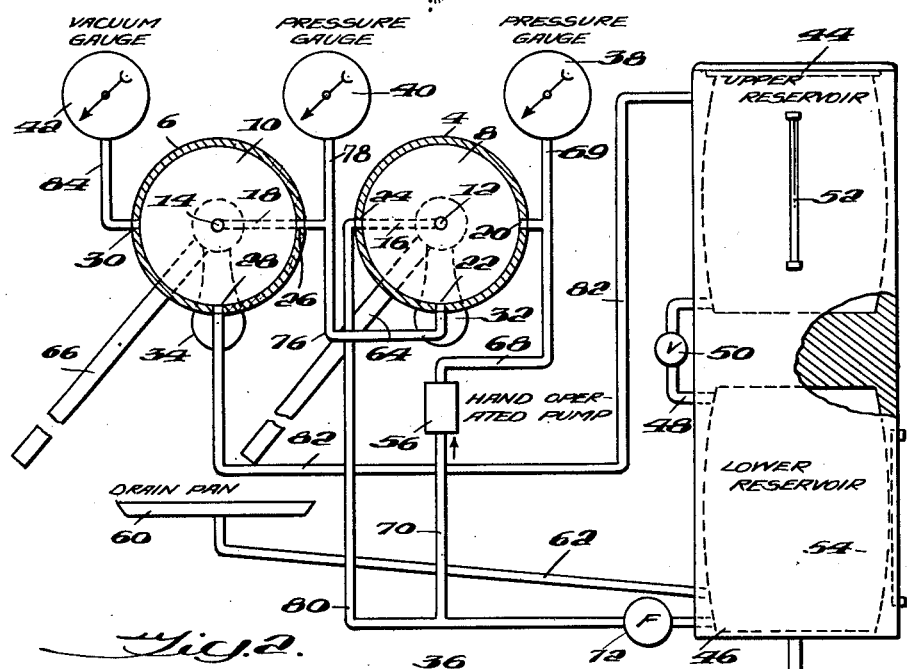
Fig. 3.
Fig. 2.
INVENTOR
ROBERT T. DOLLAR,
BY Bailey, Stephens & Huettig
ATTORNEYS

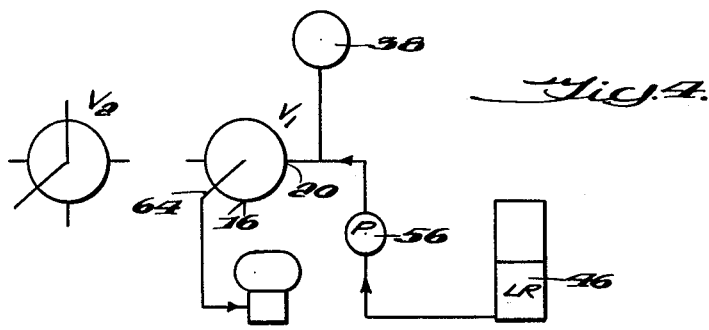
SEPARATE TEST OF CARBURETOR FOR LEAKAGE
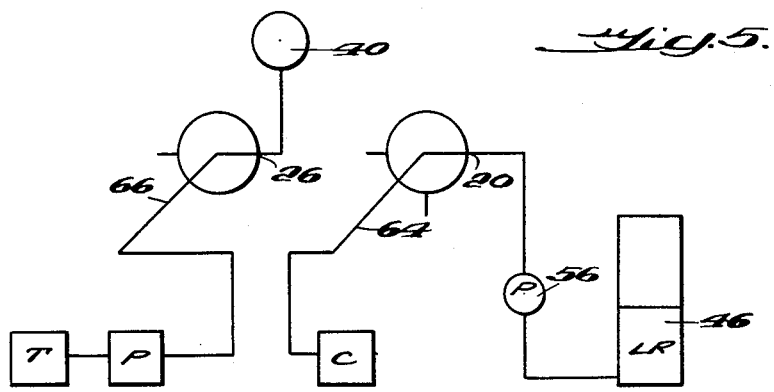
TEST OF CARBURETOR ON CAR FOR LEAKAGE AND STATIC FUEL PUMP PRESSURE
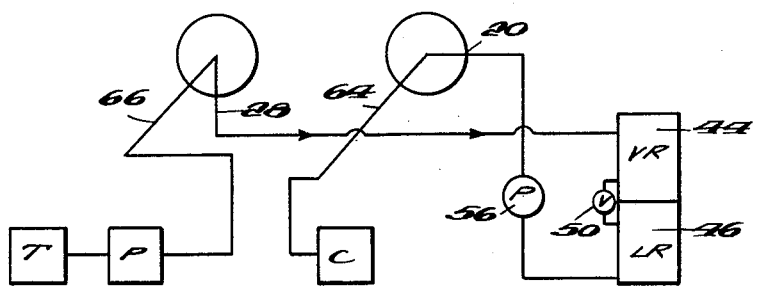
TEST OF RATE OF FEED OF FUEL PUMP

TEST OF FUEL PUMP PRESSURE OPERATING

TEST OF FUEL PUMP VACUUM

EMPTY TANK OR FUEL LINE TEST

FUEL LINE LEAK TEST

INVENTOR
ROBERT T. DOLLAR,
BY Bailey, Stephens & Huettig
ATTORNEYS

United States Patent Office 3,156,113
Patented Nov. 10, 1964

3,156,113
DEVICE FOR TESTING ENGINE FUEL SYSTEMS
Robert T. Dollar, Gainesville, Ga., assignor to Dollar
Auto Electric Service, Gainesville, Ga.
Filed Oct. 30, 1961, Ser. No. 148,375
5 Claims. (Cl. 73—116)

The invention relates to a device for testing engine fuel systems and more particularly systems using carburetors and fuel pumps.

The primary object of the invention is to provide an arrangement by which a fuel system can be checked quickly and easily, without disassembling the various parts.

Another object of the invention is to provide an arrangement which uses parts which, by the turning of certain valves and the reconnection of certain lines or hoses, can be used for carrying out several different tests.

A further object of the invention is the provision of a fuel reservoir and a hand pump in such a system, the hand pump serving both as a source of pressure fluid for certain tests and as a means to keep the engine running even when the carburetor is disconnected from the fuel tank of the vehicle.

The apparatus, in its most specific aspect provides the following tests:

(1) Test of carburetor for leakage, on or off the vehicle.
(2) Static fuel pump pressure.
(3) Rate of feed of fuel pump.
(4) Operating fuel pump pressure.
(5) Fuel pump vacuum.
(6) Empty tank or fuel line.
(7) Leakage in fuel line.

However, in its broader aspects, some of these testing possibilities may be omitted.

In general, the invention provides a pair of four-way valves, a pair of reservoirs with sight gauges, a vacuum gauge and two pressure gauges, a hand pump, and connections between these various parts which allow the carrying out of the various tests discussed above.

Further objects and advantages of the invention will appear more fully from the following description, especially when taken in conjunction with the accompanying drawings which form a part thereof.

In the drawings:

FIG. 1 shows in perspective an apparatus embodying my invention;

FIG. 2 is a front view of the panel of the apparatus;

FIG. 3 shows the various parts and their connections; and

FIGS. 4 to 10 show diagrammatically the connections used for various tests.

Figure 7:
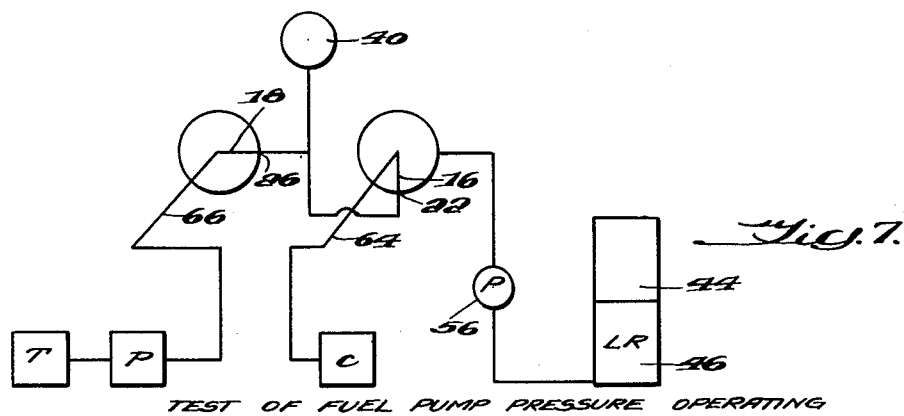

In the casing 2 are arranged a pair of four-way valves 4 and 6, having first and second main openings 8, 10 respectively, into the center of discs 12, 14 with axial passages 16, 18 communicating with the central openings. The valve casings have first and second sets each of three auxiliary openings 20, 22, 24 and 26, 28, 30 respectively which can be connected selectively to main openings 8, 10 by passages 16, 18, while in at least one position (upward in the form shown in FIG. 3) the openings 8, 10 are closed. The discs can be turned by handles 32, 34 on the outside of the panel 36.

The device further includes two pressure gauges 38, 40 and a vacuum gauge 42 on panel 36.

There are an upper reservoir 44 and a lower reservoir 46, one below the other, connected by a passage 48 in which is a manually controlled valve 50. These reservoirs have sight gauges 52, 54 one on the panel 36 and the other in the side wall of the casing. A drain valve 55 is connected to the lower reservoir 46.

A hand operated pump 56, for instance a diaphragm operated by a cam and with two check valves, or, in effect, a conventional automobile fuel pump, can be driven by a crank 58 on the front of the casing. As indicated by the arrows in FIG. 3, this feeds upwardly when the crank is turned.

On the top of the device, in front of the panel, is a drain pan 60 connected by pipe 62 to the lower reservoir 46. This collects any gasoline flowing from a carburetor being tested separately from the engine (see FIG. 4, below) and returns it to the lower reservoir.

Hoses 64 and 66 are connected to main openings 12, 14 respectively.

The following connections are provided between the various parts above described.

The first opening 20 of the set of first auxiliary openings is connected by pipe 68 to the outlet of fuel pump 56, and a branch 69 of this pipe is connected to pressure gauge 38. The inlet of pump 56 is connected by pipe 70 containing filter 72 to the bottom of lower reservoir 46. The second opening 22 of this set is connected by pipe 76 to the first opening 26 of the set of second auxiliary openings. Pressure gauge 40 is connected by branch line 78 to pipe 76. The third opening 24 of the first set is connected by pipe 80 to pipe 70 and thus through filter 72 to the lower reservoir 46.

The second opening 28 of the second set is connected by pipe 82 to the top of the upper reservoir 44. The third opening 30 is connected by pipe 84 to vacuum gauge 42.

For testing a carburetor for leakage, if it is off the vehicle, it is placed on the drain pan 60 and hose 64 is connected to the fuel inlet (FIG. 4) with valve 4 in the first position. Lower reservoir 46 is supplied with gasoline. Hand pump 56 is operated by turning crank 58. This is continued until a substantial pressure reading is obtained on gauge 38. Pumping is then stopped. If the reading on gauge 38 falls only slowly, it indicates that fuel is escaping only through the needle valve. A rapid drop in pressure shows that the carburetor is leaking.

While the carburetor still contains gasoline, it is possible to operate the throttle valve several times and to observe whether the carburetor acceleration pump, which is connected to the throttle valve, is operating properly.

The carburetor can also be tested on the vehicle by disconnecting the feed line from the fuel inlet of the carburetor and connecting hose 64 to the fuel in let (FIG. 5) as in FIG. 4, and operating pump 56. At the same time, hose 66 can be connected to the fuel line in front of the fuel pump and, with valve 6 in the first position, the static pressure of the fuel pump will be shown on pressure gauge 40. This can be done because the engine will run on the fuel supplied to the carburetor by hand pump 56. This test can be carried out at varying engine speeds.

The rate of flow of the fuel pump is tested by the connections of FIG. 6. Valve 50 is closed. Valve 4 is in the first position and valve 6 in the second position. Hose 64 is connected to the carburetor fuel inlet and hose 66 to the fuel line in front of the pump. Now, with the engine running on fuel delivered by the hand pump, the fuel pump will deliver gasoline to the upper reservoir 44. By measuring, through sight gauge 52, the amount of fuel pumped into the upper reservoir 44 in a given period of time, the rate of feed can be measured.

A particular advantage of the device in this respect is that the fuel from the fuel pump is not fed to the carburetor, so that any particles of grime, bits of gasket material or the like which may have gotten into the fuel pump or line, especially if it has been disassembled, will not be fed to the carburetor where they might cause clogging but instead are flushed out into the upper reservoir.

The operating fuel pump pressure is measured as shown in FIG. 7. Valve 4 is in the second position, valve 6 in the first position. Hose 64 is connected to the carburetor fuel inlet, and hose 66 to the fuel line in front of the fuel pump. The engine now runs on its own fuel, supplied by the fuel pump, and the operating pressure of the pump can be read on gauge 40.

Figure 8:
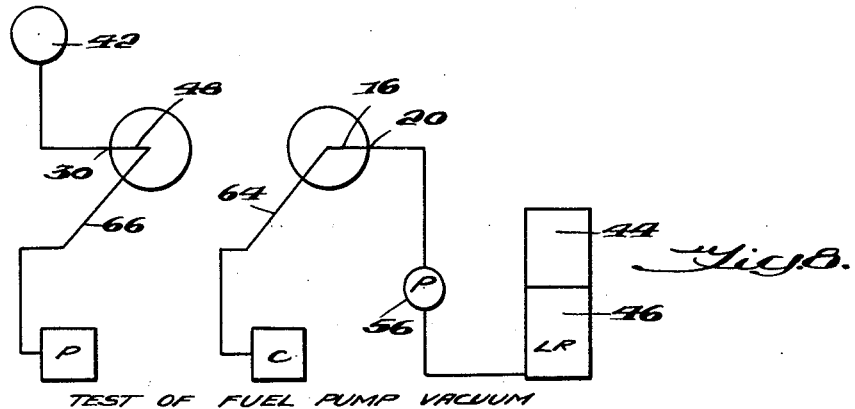

In FIG. 8, the fuel pump vacuum is tested by setting valve 6 to the third position and connecting hose 66 to the fuel pump inlet. Hose 64 is connected to the carburetor fuel inlet and valve 4 is in the first position so that fuel can be supplied by hand pump 56.

Figure 9:
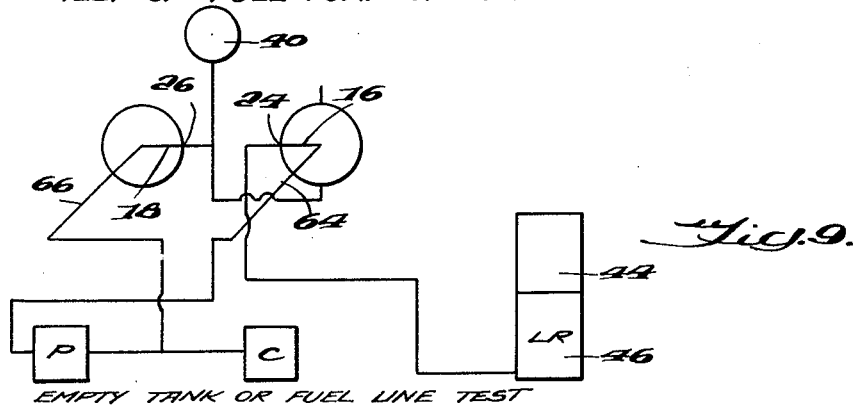

In FIG. 9, hose 64 is connected to the fuel pump inlet and hose 66 by a T between the fuel pump and the carburetor. Valve 4 is in the third position and valve 6 in the first position. This test is used if it is suspected that the fuel pump may be getting no fuel from the tank, etiher because the tank is empty or because the line is clogged. If the engine runs properly, drawing fuel from the lower reservoir 46, it indicates that the fuel pump and carburetor are operating properly, and that any trouble is behind the fuel pump.

Figure 10:
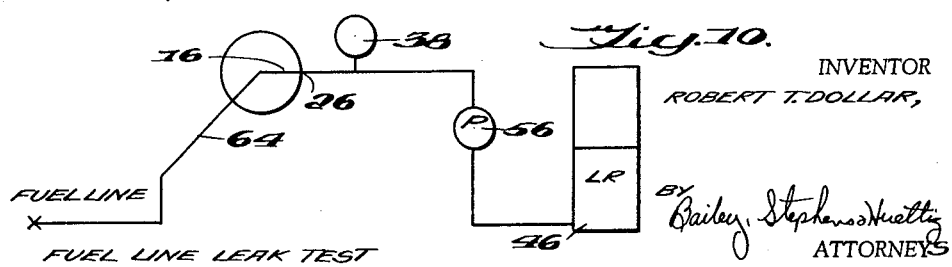

The fuel line can be tested, as shown in FIG. 10, by plugging one end, as at x, and connecting hose 64 to the other end. Valve 4 is in the first position. Operation of pump 56 forces fuel into the line. If the pressure on the fuel, as shown by gauge 38, remains constant, there is no leak, while a drop in pressure indicates a leak.

By opening valve 50, the upper reservoir can be emptied and the fuel in it is held in the lower reservoir for use in further testing.

While I have described herein one embodiment of my invention, I wish it to be understood that I do not intend to limit myself thereby except within the scope of the claims hereto or hereinafter appended.

I claim:

1. A device for testing engines comprising means forming a pair of reservoirs one above the other, a valved connection between said reservoirs, a first valve means including a first main opening and at least two first auxiliary openings and means for selectively connecting said first main opening to either of said first auxiliary openings, a second valve means comprising a second main opening and at least two second auxiliary openings and means for selectively connecting said second main opening to either of said second auxiliary openings, means connected to said first main opening adapted for connection to the fuel inlet of a carburetor, and means connected to said second main opening adapted for connection to a fuel pump outlet, a hand operated pump having its intake connected to the lower reservoir to withdraw fuel therefrom, means connecting the outlet of the pump to a first of said first auxiliary opennigs, means connecting a second of said first auxiliary openings to a first of said second auxiliary openings, a pressure gauge connected to said last connecting means, and means connecting the second of said second auxiliary openings to the upper of said reservoirs.

2. A device for testing engines comprising means forming a reservoir, a first valve means including a first main opening and at least two first auxiliary openings and means for selectively connecting said first main opening to either of said first auxiliary openings, a second valve means comprising a second main opening and at least two second auxiliary openings and means for selectively connecting said second main opening to either of said second auxiliary openings, means connected to said first main opening adapted for connection to the fuel inlet of a carburetor, and means connected to said second main opening adapted for connection to a fuel pump outlet and a fuel pump inlet, a hand operated pump having its intake connected to the reservoir to withdraw fuel therefrom, means connecting the outlet of the pump to a first of said first auxiliary openings, means connecting a second of said first auxiliary openings to a first of said second auxiliary openings, a vacuum gauge, and means connecting the other of said second auxiliary openings to the vacuum gauge.

3. A device for testing engines comprising means forming a reservoir, a first valve means including a first main opening and three first auxiliary openings and means for selectively connecting said first main opening to any one of said first auxiliary openings, a second valve means comprising a second main opening and at least two second auxiliary openings and means for selectively connecting said second main opening to either of said second auxiliary openings, means connected to said first main opening adapted for connection to the fuel inlet of a carburetor and to a fuel pump inlet, and means connected to said second main opening adapted for connection to a fuel pump outlet, a fuel pump inlet, and a line between a fuel pump and a carburetor, a hand operated pump having its intake connected to the lower reservoir to withdraw fuel therefrom, means connecting the outlet of the pump to a first of said first auxiliary openings, means connecting a second of said first auxiliary openings to a first of said second auxiliary openings, a pressure gauge connected to said last connecting means, means connecting the third of said first auxiliary openings to said reservoir, a vacuum gauge, and means connecting the other of said second auxiliary openings to said vacuum gauge.

4. A device for testing engines comprising means forming a pair of reservoirs one above the other, a valved connection between said reservoirs, a first valve means including a first main opening and three first auxiliary openings and means for selectively connecting said first main opening to any one of said first auxiliary openings and for closing said first main opening, a second valve means comprising a second main opening and at least two second auxiliary openings and means for selectively connecting said second main opening, to either of said second auxiliary openings and for closing said second main opening, said first main opening having means connected thereto adapted for connection to the fuel inlet of a carburetor, to a fuel pump inlet and to a fuel line, and said second main opening having means connected thereto adapted for connection to a fuel pump outlet and to a line between a fuel pump and a carburetor, a hand operated pump having its intake connected to the lower reservoir to withdraw fuel therefrom, means connecting the outlet of the pump to a first of said first auxiliary openings, a first pressure gauge connected to said last connecting means, means connecting a second of said first auxiliary openings to a first of said second auxiliary openings, a second pressure gauge connected to said last connecting means, means connecting the third of said first auxiliary openings to the lower of said reservoirs, and means connecting the second of said second auxiliary openings to the upper of said reservoirs.

5. A device for testing engines comprising means forming a pair of reservoirs one above the other, a valved connection between said reservoirs, a first valve means including a first main opening and three first auxiliary openings and means for selectively connecting said first main opening to any one of said first auxiliary openings and for closing said first main opening, a second valve means comprising a second main opening and three second auxiliary openings and means for selectively connecting said second main opening to any one of said second auxiliary openings and for closing said second main opening, said first main opening having means connected thereto adapted for connection to the fuel inlet of a carburetor, to a fuel pump inlet and to a fuel line, and said second main opening having means connected thereto adapted for connection to a fuel pump outlet, to a fuel pump inlet, and to a line between a fuel pump and a carburetor, a hand operated pump having its intake connected to the lower reservoir to withdraw fuel therefrom, means connecting the outlet of the pump to a first of said first auxiliary openings, a first pressure gauge connected to said last connecting means, means connecting a second of said first auxiliary openings to a first of said second auxiliary openings, a second pressure gauge connected to said last connecting means, means connecting the third of said first auxiliary openings to the lower of said reservoirs, means connecting the second of said second auxiliary openings to the upper of said reservoirs, a vacuum gauge, and means connecting the third of said second auxiliary openings to said vacuum gauge.

References Cited by the Examiner

UNITED STATES PATENTS

| | | | |
|---|---|---|---|
| 1,853,970 | 4/32 | Gauthier | 73—113 |
| 2,062,173 | 11/36 | Haskins | 73—118 X |
| 2,073,243 | 3/37 | Liddell et al. | 73—118 X |
| 2,098,677 | 11/37 | Saballus et al. | 73—118 |
| 2,333,252 | 11/43 | Ikert | 73—118 X |
| 2,494,936 | 1/50 | Edelen | 73—49.7 |
| 2,652,719 | 9/53 | Bracci | 73—113 |
| 2,859,611 | 11/58 | Morse | 73—118 |
| 3,001,397 | 9/61 | Leonard | 73—219 X |

RICHARD C. QUEISSER, *Primary Examiner.*

DAVID SCHONBERG, *Examiner.*